(12) United States Patent
Garibaldi

(10) Patent No.: US 6,478,833 B1
(45) Date of Patent: Nov. 12, 2002

(54) ABRASIVE COMPOSITION AND TOOLS FOR STONE MATERIALS AND CERAMICS

(76) Inventor: Riccardo Garibaldi, 18, Via Elba -, 55045 Pietrasanta (Lucca) (IT)

( * ) Notice: Subject to any disclaimer, the term of this patent is extended or adjusted under 35 U.S.C. 154(b) by 0 days.

(21) Appl. No.: 09/831,495

(22) PCT Filed: Sep. 7, 2000

(86) PCT No.: PCT/IT00/00354
§ 371 (c)(1),
(2), (4) Date: May 10, 2001

(87) PCT Pub. No.: WO01/19938
PCT Pub. Date: Mar. 22, 2001

(30) Foreign Application Priority Data

Sep. 10, 1999 (IT) .......................................... FI99A0187

(51) Int. Cl.[7] ........................... B24D 18/00; B24D 3/02; B24D 3/04; B24D 3/14; C09K 3/14
(52) U.S. Cl. .............................. 51/307; 51/298; 51/308; 51/309; 51/293
(58) Field of Search ................. 51/298, 307, 308, 51/309, 293; 264/678, 603, 319, 670

(56) References Cited

U.S. PATENT DOCUMENTS 2,555,174 A * 5/1951 Whittaker et al. ............ 51/309
4,867,759 A * 9/1989 Tiefenbach, Jr. et al. ..... 51/298
4,898,579 A * 2/1990 Hay et al. ...................... 51/307
5,094,671 A * 3/1992 Hall et al. ...................... 51/298
5,651,801 A * 7/1997 Monroe et al. ................ 51/309
5,711,774 A * 1/1998 Sheldon ......................... 51/307

FOREIGN PATENT DOCUMENTS

| EP | 0 355 630 | 8/1989 |
| JP | 55042737 | 3/1980 |
| WO | WO 97/37815 | 4/1997 |

OTHER PUBLICATIONS

Database WPI Section Ch, Week 198617 Derwent Publication Ltd., London, GB; Class L02, AN 1986–112190 XP002157845 10/85.

* cited by examiner

*Primary Examiner*—Michael Marcheschi
(74) *Attorney, Agent, or Firm*—Browdy and Neimark, P.L.L.C.

(57) ABSTRACT

Abrasive composition for the manufacture of tools for the execution of surface treatments on stone and ceramic materials, comprising a superabrasive and a binder comprising a frit approximately melting between 450° C. and 650° C. and a refractory material. The composition also comprises a chemically inert abrasive material for thermally and mechanically protecting the superabrasive.

13 Claims, No Drawings

ABRASIVE COMPOSITION AND TOOLS FOR STONE MATERIALS AND CERAMICS

REFERENCE TO RELATED APPLICATIONS

The present application is the national stage under 35 U.S.C. 371 of international application PCT/IT00/00354, filed Sep. 7, 2000 which designated the United States, and which international application was published under PCT Article 21(2) in the English language.

DESCRIPTION

1. Field of the Invention

The present invention relates to an abrasive composition for the manufacture of tools for the execution of treatments of surfaces in the field of the stone materials and the ceramics.

The invention also relates to an abrasive tool manufactured by using the above-mentioned composition.

2. Background art

Various kinds of abrasive tools are known which have different structure as a function of the kind of use they are destined to: surface treatment, cut, perforation and the like. In the field of surface treatments the most common operations are roughing, smoothing, polishing, super finishing and the tools aimed at these operations generally assume the form of a grinding wheel or of tablets, sectors, inserts and other forms which are applied to suitable support plates or pads equipped with coupling means for the connection to a machine by means of which the treatment is carried out, or they are directly connected to the machine in any other known way. Among the abrasive materials those belonging to the family of the aluminum oxides, such as corundum, are commonly used, the silica based compounds such as silicon carbide, as well as the so-called "superabrasives", that is natural or synthetic diamond powder and the synthetic nitrides, for example CBN (cubic boron nitride), essentially used in the field of the treatments of metal surfaces.

Up to now, for the treatment of the surfaces of stone-like materials, such as marble, granite and stones in general, or of ceramic materials, such as ceramics, gres and derivatives, abrasive compositions have been used which comprise an abrasive material, for example diamondiferous material or silicon carbide, agglomerated with a mineral binder, in particular a magnesian binder possibly with the addition of a phenolic resin, or with resinous binder generally consisting of epoxy or phenolic resins.

The abrasive tools using resinous materials as a binder present several advantages with respect to those using magnesian materials, the most important of which is the greater effectiveness of use, that is the greater speed of performing the treatment on surfaces of the same characteristics. They present, on the other hand, a lower support stiffness of the abrasive particles, what involves the tendency to produce an increased abrasion on tender materials, and hence they proved to be unsuitable with materials such as granite as regards the "pore closure", i.e. the porosity reduction, of the surfaces under treatment. Besides, because of the relative elasticity of the resinous binder, beyond certain operating pressures the abrasive sinks into the binding matrix instead of attacking the surface to be treated, therefore, for example, ceramic surfaces cannot be treated when already installed. At last, each surface treatment among those mentioned above, requires various passages with abrasive tools of different grain size characteristics, therefore the treatment times are always relatively long.

SUMMARY OF THE INVENTION

The main purpose of the present invention is to provide a new abrasive composition for the manufacture of tools destined to the execution of surface treatments such as roughing, smoothing and polishing on stone materials and ceramics able to offer higher performances with respect to the current state of the art, both as the treatment life and the treatment execution time are concerned.

A particular purpose of the present invention is to provide an abrasive composition of the above mentioned kind which makes possible the manufacture of abrasive tools, whose compactness and stiffness can be optimized as a function of the use conditions, the kind of machine, the operating pressures, the number of revolutions and other operating parameters.

A further purpose of the present invention is to provide an abrasive tool for the treatment of surfaces of stone materials and ceramic materials characterized by an effectiveness of use considerably higher than that of the conventional tools.

These purposes are reached with the abrasive composition according to the present invention, comprising at least a superabrasive and a binder and characterized in that the binder comprises a frit approximately melting between 450° C. and 650° C. and a refractory material, said composition further comprising a chemically inert abrasive material for thermally and mechanically protecting said superabrasive.

DESCRIPTION OF THE PREFERRED EMBODIMENT

Preferably the frit is an aluminum silicate based frit containing oxides of alkaline metals, alkaline-earth metals and boron. Particularly preferred are the frits of the above-mentioned kind which are lead-free and have melting temperatures of about 500° C. As refractory material there can be used pumice, kaolin, clay, feldspar, magnesia and equivalent materials.

The superabrasive is constituted by diamondiferous material, that is synthetic diamond or natural diamond or mixtures thereof. The grain size of the diamondiferous material is typically comprised between 30 and 1800 mesh depending on the intended use of the tool (roughing, smoothing, polishing).

As a chemically inert abrasive material there advantageously can be used corundum, aluminum oxide, silicon carbide, silica and derivatives. In the present description this abrasive material is defined as "chemically inert" in view of the fact that, at the operating conditions set forth for the tool production process, it does not react with the binder, nor undergo thermal decomposition. The grain size of the chemically inert abrasive material must generally be lower than that of the superabrasive as otherwise the latter would turn out screened by the inert one and could not perform any abrasive function, especially on hard surfaces. As a matter of fact, the presence of an even limited fraction of abrasive with a granule size substantially equal to that of the superabrasive has proven to be useful to mechanically protect the superabrasive fraction and to increase the lifetime of the tool, while, on the other side, a substantial amount of abrasive with fine granule size has proven to be useful both to preserve the compactness of the abrasive workpiece and to act as a coating of the superabrasive granule reducing the surface exposed to the air and protecting it above all against the high temperatures that could degrade it. Therefore, advantageously, the composition according to the present invention contains two fractions of abrasive material of different grain size, in particular a fine grain fraction (1.5 to 3μ) and a larger grain fraction, or coarse fraction, with a grain size of the same range as that of the superabrasive. The proportion of the fine fraction to the coarse fraction is comprised between 2/1 and 5/1 and preferably about 3/1.

In the abrasive composition according to the present invention, the superabrasive is present in the conventional per cent concentration comprised between 0.2 and 4 Kt/cc, while the binder has the following weight per cent composition:

| | |
|---|---|
| frit | 50 to 80% |
| refractory | 20 to 50%. |

Taking into consideration also the inert abrasive and with the above-mentioned superabrasive concentration, the composition according to the present invention is the following:

| | | |
|---|---|---|
| frit | 20 to 80 | % wt |
| refractory | 10 to 50 | % wt |
| inert abrasive | 10 to 50 | % wt. |

The amount of binder depends on the grain size of the diamondiferous material and changes with it; the finer the grain of the diamondiferous material is, the lower is the amount of binder and proportionally greater is the amount of abrasive.

As a non-limiting example, a particularly preferred abrasive composition is given herebelow. It contains synthetic diamond powder at a concentration equal to 1 Kt/cc and the following weight percent of the other components:

| | |
|---|---|
| frit | 40 |
| pumice | 30 |
| aluminum oxide | 30 |

The tool made with this composition is particularly suited for carrying out a smoothing treatment.

The frit used in the present invention is a commercial product consisting of aluminum silicate containing boron and sodium oxides and small amounts of potassium and calcium oxides and free from lead. The grain size is $10^4$ mesh/cm$^2$. The refractory is constituted by white pumice in powder form of the commercial kind with a grain size lower than 400 mesh.

The inert abrasive is essentially constituted by aluminum oxide (over 99%), in powder form, with a grain size comprised between 200 mesh, for the coarse fraction, and 1.5 to 3μ, for the fine fraction.

The manufacture of an abrasive tool by using the composition according to the present invention can be carried out as follows. Two mixtures, one containing the diamondiferous powder and the coarse fraction of the inert abrasive and the other one containing the frit, the refractory and the fine fraction of the inert abrasive, are prepared separately. The first mixture is moistened with a furfural-added phenolic resin to wet the diamondiferous powder and facilitate the coating of the diamond particles, while the second one can be added with furfural or equivalent alcohol.

The mixtures are homogenized thoroughly and then mixed together. The resulting mixture is homogenized and divided into doses of prefixed weight which are cold moulded in the desired shapes. The resulting workpieces are then heated in a kiln in such a way to cause the melting of the frit and the successive cooling according to a prefixed thermal cycle, in which the heating is carried out stepwise up to a temperature at least equal, and generally higher, to the melting temperature of the frit as a function of the type of refractory used, while the cooling to room temperature takes place in a natural way in the same kiln, after the heat source has been shut off.

As a result of the thermal cycle of heating and cooling the frit vitrifies and mechanically binds the various components, while the refractory keeps under control the consistency of the workpieces during the heating to avoid an excessive softening thereof. In other words, the refractory allows the frit to melt and hence vitrify, thereby developing its binding action, but at the same time it assures the consistency necessary to keep the shape features of the workpieces.

The abrasive tool obtained in this way is for example in the form of a cylindrical tablet form and can be applied, for example by glueing, to a rigid or semi-rigid disk support or pad in a number adequate to cover a certain portion of its surface. The so equipped support is mounted on the machine for the execution of the intended treatment by means or conventional coupling means which the support is provided with. Alternately, if the machine is provided with suitable tool carrier spindle, the tools can be applied to the machine directly.

The product which is obtained has a cost higher than that of the abrasive tools using resinous binder but such cost is widely offset by the greater productivity of the tool which results in markedly lower treatment time. With the abrasive tool according to the present invention it is possible to carry out the treatment of a marble or granite surface, such as smoothing, through the passage of only one type of tool, while according to the prior art two of more, different grain size tools to pass in succession on the surface to be treated are necessary.

By way of comparison, a test was carried out using a diamond resinous tool of the best commercially available quality and a tool according to the invention of composition equal to that of the above referred example to carry out the smoothing of a 20 m$^2$ granite surface which was previously submitted to roughing.

The surface was divided in two equal parts which were machined with the tool according to the invention and the commercial one respectively. In the first case a 100 mm pad with a 76 mm internal hole was used; ten 12 mm diameter cylindrical tablets were applied on an annular surface of the disk corresponding to an abrasive surface approximately equal to 1130 mm$^2$. The nominal grain of the tool was 220. In the second case the same degree of smoothing and quality of the respective surface portion was reached using three subsequent pads having nominal grains 60, 120, and 220, respectively. The diameter of the pads was 100 mm with a 78 mm internal hole. On an annular surface of each of them sixteen 13×10×11 mm trapezoidal tablets were arranged resulting in a total abrasive 25 surface approximately equal to 2016 mm$^2$. The time necessary for the execution of the treatment, carried out by the same operator and with the same machine, turned out to be 15 minutes in the first case and 45 minutes in the second one.

The high stiffness of the vitreous matrix embedding the diamond powder allows for the tool according to the present invention to be used to restore damaged ceramic surfaces, for example, scratched or worn by treading, which would be impossible to treat by means of any other abrasive tool known in the art.

Variations and/or modifications can be brought to the abrasive composition for manufacturing abrasive tools for stone materials, ceramics and the like, according to the present invention without departing from the scope of the invention as set forth in the attached claims.

What is claimed is:

1. In an abrasive composition for the manufacture of tools for surface treatments on stone and ceramic materials, comprising a superabrasive and a binder, the improvement wherein said binder comprises a frit having a melting temperature in the range of 450°–650° C. and a refractory material, said composition also comprising a chemically inert abrasive material for thermally and mechanically protecting said superabrasive, wherein said chemically inert abrasive material comprises two fractions having different grain sizes, a first said fraction having a grain size substantially equal to that of said superabrasive and a second fraction of finer grain size than that of said superabrasive.

2. The abrasive composition according to claim 1, wherein said superabrasive is natural or synthetic diamond powder or a mixture thereof.

3. The abrasive composition according to claim 1, wherein said refractory material is selected from the group consisting of pumice, clay, feldspar, and magnesites.

4. The abrasive composition according to claim 1, wherein the chemically inert abrasive material is selected from the group consisting of aluminum oxide, silicon carbide, and silica.

5. The abrasive composition according claim 1, wherein said binder has the following % wt composition:

| | |
|---|---|
| frit | 50 to 80 wt % |
| refractory material | 20 to 50 wt %. |

6. The abrasive composition according to claim 1, comprising 0.2 to 4 Kt/cc of superabrasive and having by the following % wt of components:

| | |
|---|---|
| frit | 20 to 80 wt % |
| refractory material | 10 to 50 wt % |
| inert abrasive | 10 to 50 wt %. |

7. The abrasive composition according to claim 6, wherein the ratio of the finer second fraction to the first fraction of said chemically inert abrasive material is between 2/1 and 5/1.

8. An abrasive tool having an abrasive surface comprising a composition according to any one of claims 1–4 or 3–7.

9. A method for manufacturing an abrasive tool having a composition according to any one of claims 1 to 4 or 5 to 7, comprising:

preparing a first mixture containing the superabrasive and the first fraction of the chemically inert abrasive material;

preparing a second mixture containing the frit, the refractory material and the second fraction of finer grain size of chemically inert abrasive material;

wetting the first mixture and the second mixture;

blending the two mixtures together to provide a blend thereof;

submitting predetermined quantities of said blend to press molding to obtain pressed workpieces;

submitting said workpieces to heating at least to the melting temperature of the frit, and subsequently to cooling.

10. The method according to claim 9, wherein the heating to the melting temperature of the frit is carried out in a series of steps in which the temperature is incrementally raised, and is followed by withdrawal of heat whereby the workpieces are permitted to cool.

11. The method of claim 9, wherein in said wetting step, said first mixture is wetted with phenolic resin and furfural and said second mixture is wetted with furfural.

12. The abrasive composition of claim 1, wherein said second fraction of finer grain size is of a size sufficiently small so as to act as a coating on granules of said superabrasive.

13. The abrasive composition of claim 12, wherein the grain size of (1) the superabrasive granules and (2) the first fraction of said chemically inert abrasive material is in the range between 30 and 1800 mesh, and the grain size of said second fraction of finer grain size is 1.5 to 3μ.

* * * * *